A. C. BACK.
HAME CLIP.
APPLICATION FILED FEB. 3, 1913.
1,120,785.
Patented Dec. 15, 1914.
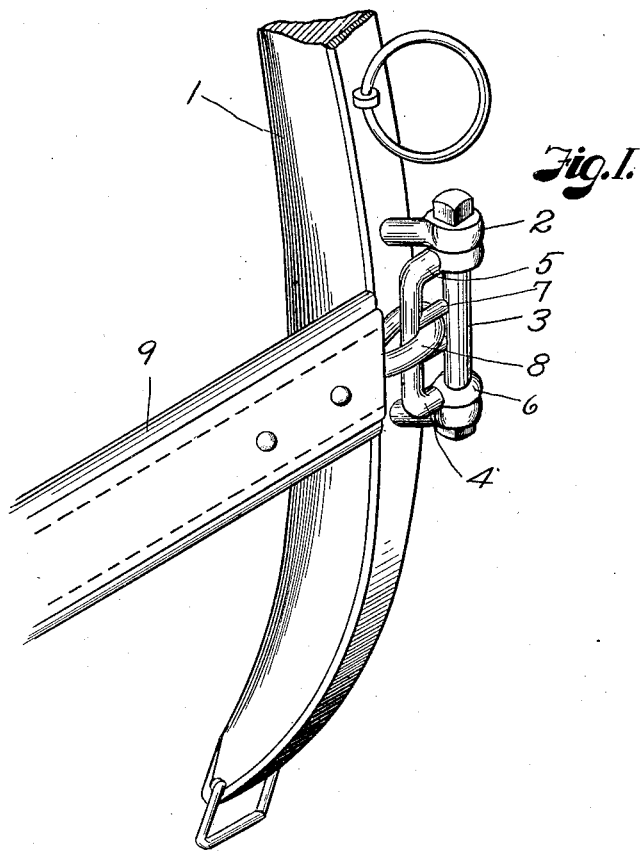
Fig. I.
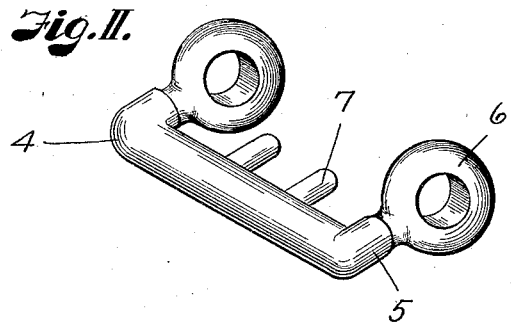
Fig. II.
WITNESSES:
Lewis L. Miller
Arthur W. Capz.
INVENTOR
A. C. Back.
BY
Arthur C. Brown
ATTORNEY

UNITED STATES PATENT OFFICE.

AUGUST C. BACK, OF SPRING HILL, KANSAS.

HAME-CLIP.

1,120,785. Specification of Letters Patent. Patented Dec. 15, 1914.

Application filed February 3, 1913. Serial No. 746,045.

*To all whom it may concern:*

Be it known that I, AUGUST C. BACK, a citizen of the United States, residing at Spring Hill, in the county of Johnson and State of Kansas, have invented certain new and useful Improvements in Hame-Clips; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hame clips, and has for its principal object to provide a device of that type which may be applied to hames of any ordinary construction, and whereby tugs may be adjustably connected with the hames in order that the line of draft may be varied to suit the collar or hame to the animal upon which the collar is worn. In accomplishing this object I have provided the improved details of structure hereinafter described and illustrated in the accompanying drawings, wherein:—

Figure I is a perspective view of a hame equipped with a clip constructed according to my invention, and showing a tug mounted on the clip. Fig. II is a detail perspective of the clip.

Referring more in detail to the parts: 1 designates a hame, of ordinary construction, having eye members 2 fixed in its outer edge, and provided with the ordinary removable clip pin or bolt 3.

Pivotally mounted on the pin 3, between the eye members 2, is a clip 4 comprising a U-shaped body, having legs 5 provided with eye members 6 which are adapted to fit over and pivot on the pin 3. The base of the clip is provided with studs 7 which extend parallel with the legs 5, and are of such length that when the clip is mounted on the hame pin, the loop 8 of a tug 9 which may be mounted on the clip, will be held in place at either side of or between said studs.

In using the device, the tug loop is applied to the clip before the latter is connected with the hame and the line of draft determined by the adjustment of the loop relative to the studs 7, as it is apparent that with the loop located between the lower stud and the lower leg of the clip the line of draft will be lower than if the loop were between the two studs or between the upper stud and upper leg of the loop. With the tug loop in place, the eye members of the clip are projected between the eye members of the hame, and the pin 3 projected through all of said eye members, as illustrated in Fig. I. When the parts are in this position, the clip may pivot on the pin and the tug loop may pivot laterally and vertically on the clip but may not escape from the clip or vary its adjustment thereon, for the reason that it is confined in its adjusted position by the studs 7. If, however, it should be desired to vary the line of draft, the clip may be easily and quickly removed and the tug loop adjusted to a different position relative to the studs so that when the clip is replaced on the hame the new line of draft will be maintained.

Having thus described my invention, what I claim as new therein, and desire to secure by Letters-Patent, is:—

1. The combination with a hame having spaced eye members thereon, of a clip having a plurality of apertures, open at one side, a trace loop adapted for projection into any one of said apertures, and a pin for pivotally connecting said clip to said eye members, and confining said trace loop in one of said apertures.

2. The combination with a hame having spaced eye members thereon, of a clip having an eye member at each end and a plurality of slots between said eye members, a trace loop adapted for projection over either of said clip eye members, and into any one of said slots, and a pin adapted for projection through all of said eye members and for closing said slots to retain said trace loop in position.

In testimony whereof I affix my signature in presence of two witnesses.

AUGUST C. BACK.

Witnesses:
ALEX HINES,
J. W. JAMES.

Copies of this patent may be obtained for five cents each, by addressing the "Commissioner of Patents, Washington, D. C."